United States Patent [19]

Centeny

[11] Patent Number: 4,524,989
[45] Date of Patent: Jun. 25, 1985

[54] LAMINATED, REINFORCED FORK END FITMENT CONNECTOR FOR A BICYCLE AND PROCESS FOR MANUFACTURING SAME

[75] Inventor: Norman L. Centeny, Norridge, Ill.

[73] Assignee: Schwinn Bicycle Company, Chicago, Ill.

[21] Appl. No.: 510,632

[22] Filed: Jul. 5, 1983

[51] Int. Cl.³ ............... B62K 19/30; B62K 25/02
[52] U.S. Cl. ............... 280/281 R; 280/288; 474/116
[58] Field of Search ............. 280/288, 284, 281 R, 280/279, 276, 274, 238; 474/116

[56] References Cited

U.S. PATENT DOCUMENTS 4,174,851 11/1979 Huret ............... 280/288

FOREIGN PATENT DOCUMENTS

| 903503 | 10/1945 | France | 280/288 |
| 1036415 | 8/1953 | France | 280/238 |
| Ad.58031 | 9/1953 | France | 280/281 R |
| 224203 | 2/1925 | United Kingdom | 280/279 |

Primary Examiner—John A. Pekar
Attorney, Agent, or Firm—McCaleb, Lucas & Brugman

[57] ABSTRACT

A bicycle fork end fitment connector comprising a two- or three-layer lamination press-welded into a unitary part. A base plate is cold-formed from flat, uniform thickness mild steel plate stock and has a slot. One or two face plates are formed from flat, uniform thickness stainless steel sheet stock each having a slot matching the size and shape of the slot in the base plate. A plurality of small diameter convex protuberances are formed on one side of each face plate before assembly. The base and face plates are assembled in an electric press welder with the slots in registration, while current is applied to fuse them into a solid unit. In one embodiment, a single face plate is assembled on one side only of the base plate. In another embodiment, a pair of face plates are assembled on opposite sides of the base plate. The face plate or plates comprise a raised hub portion or portions, the opposite, outer surfaces of the connector being precisely flat and parallel. By contrast with conventional hot-forged connectors, the laminated end product is closer to specified dimensions, is better looking, with clean, sharp, modern lines, and cost savings of 40% and more are achieved with no trade-off in quality, strength and durability. The invention is applicable to both rear and front fork end fitment connectors.

4 Claims, 10 Drawing Figures

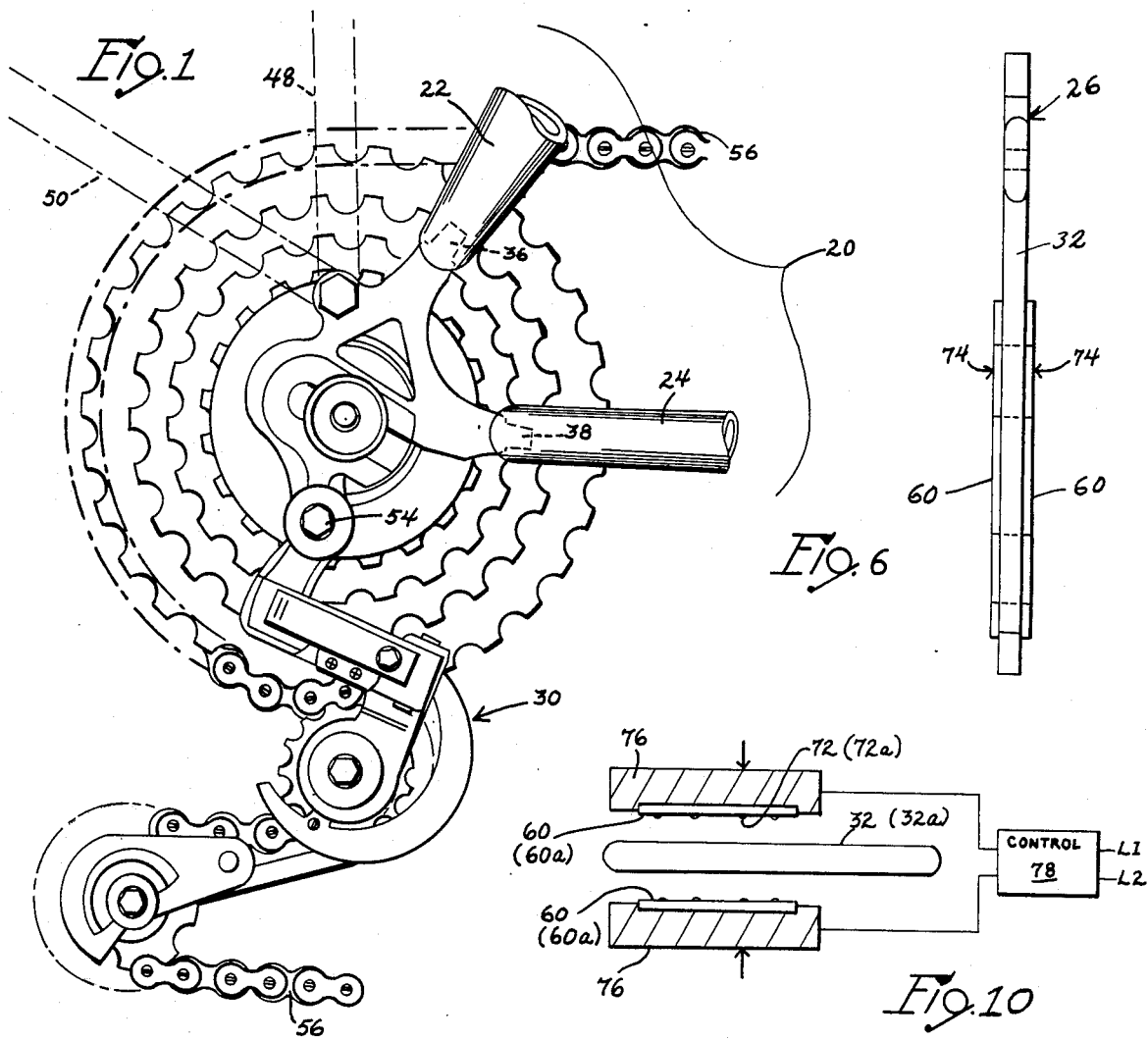
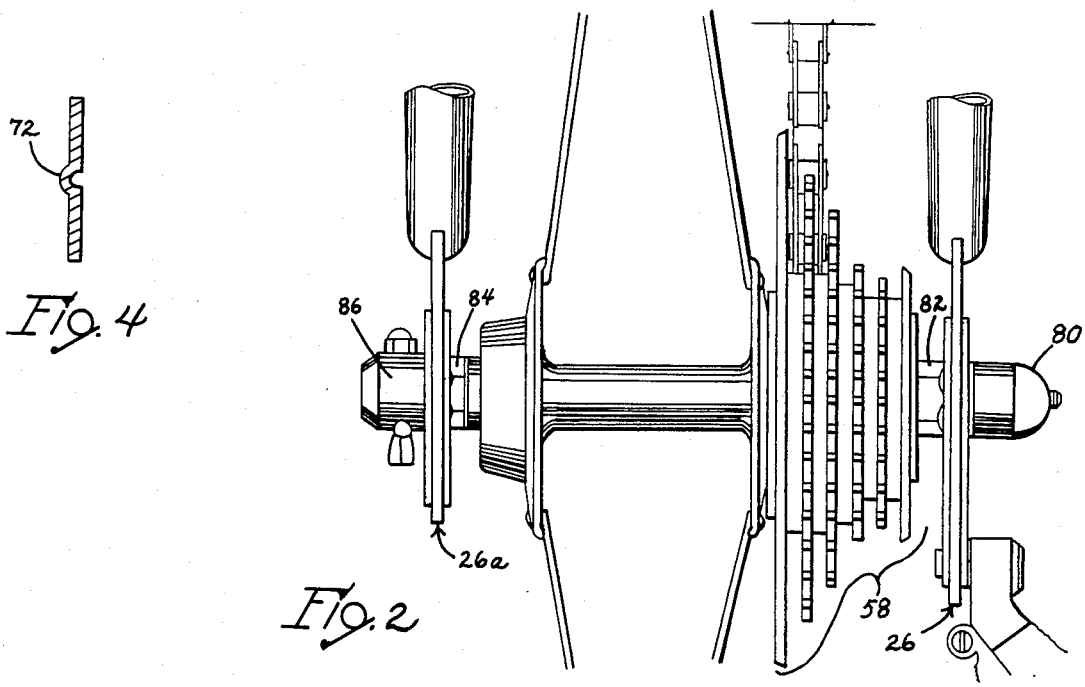

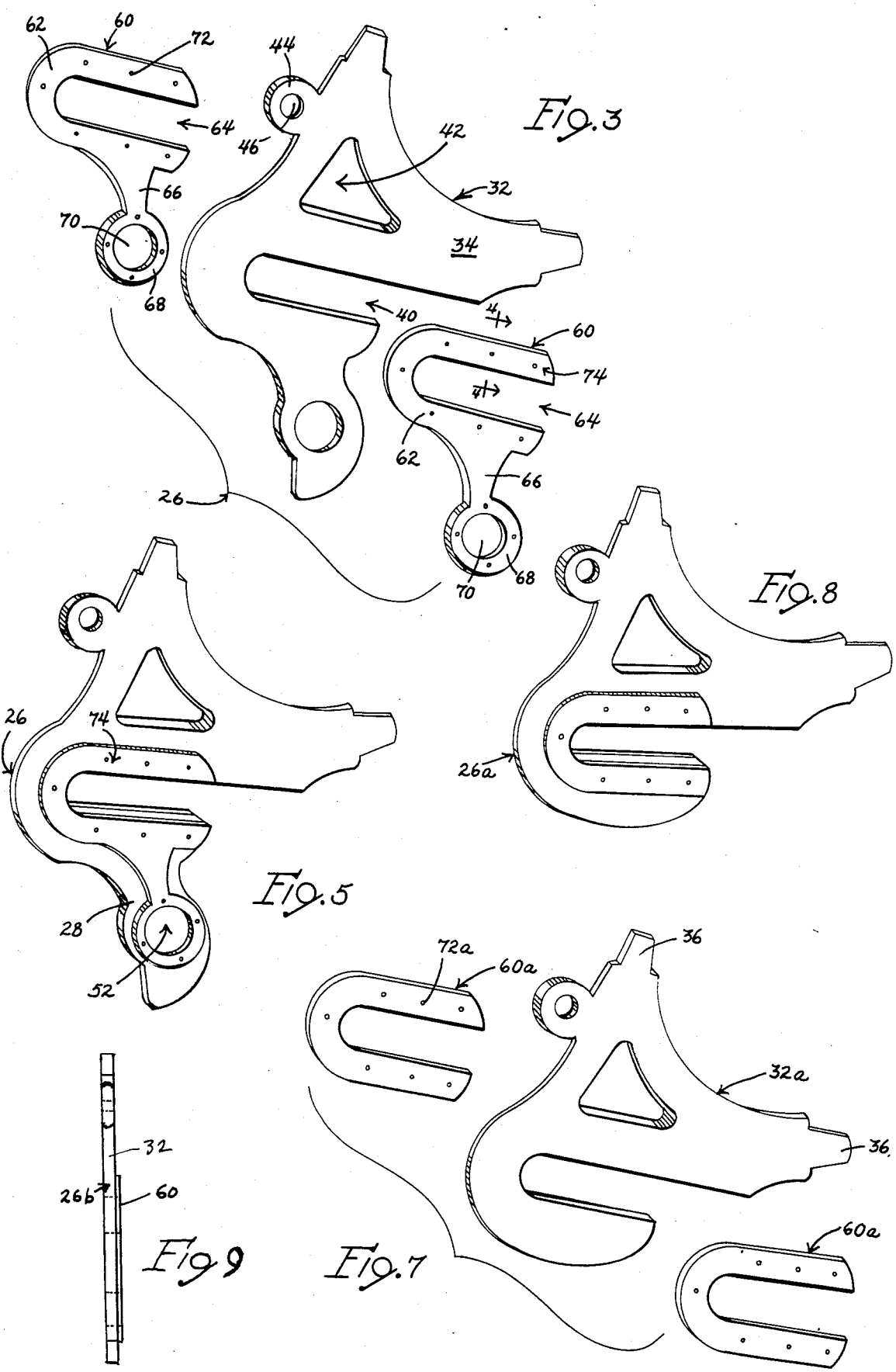

LAMINATED, REINFORCED FORK END FITMENT CONNECTOR FOR A BICYCLE AND PROCESS FOR MANUFACTURING SAME

BACKGROUND OF THE INVENTION

This invention pertains generally to bicycles and particularly to an improved front or rear fork end fitment connector. For purposes of illustration, the invention will be described in detail as applied to a rear fork connector and it will be apparent that it may likewise be applied to a front fork end fitment connector utilizing the same principles.

Typically, a bicycle frame has a rear fork including upper frame stays and lower frame stays arranged in pairs on opposite sides of the rear wheel. These diverge upwardly and forwardly from the rear axle and are welded or otherwise secured to the frame at locations behind the seat post and the crank hanger respectively.

At each end of the rear axle, the two stays are secured as by welding to a rear fork end fitment connector having an open ended slot in which the rear axle is mounted. Similarly, there is a front end fitment connector of somewhat another size, on each side of the fork having an open-ended slot in which the front axle is mounted.

Each fitment connector has a thickened hub portion surrounding the axle-engaging slot. The hub portion has opposite raised surfaces which extend about one-sixteenth inch outwardly from the main body portion of the connector to thereby provide opposite bearing surfaces for an external axle nut and an internal axle lock nut respectively. These raised bearing surfaces at opposite ends of the thickened hub must be perfectly flat and parallel to one another to provide solid, flatwise seating engagement with the respective nuts and prevent loosening in service. Further, to prevent unsightly scratching and corrosion of these outer hub surfaces, they are buffed and chromium-plated.

These fitment connectors take the entire load applied by the frame to the wheel, and are therefore subject to very high stresses. To obtain the required strength, they have customarily been made of steel; and to provide the thickened hubs, they have been manufactured by conventional hot forging techniques which involve costly tools and dies, expensive mechanical and heat energy, and substantial investments in heavy machinery and labor. The additional step of chromium plating the outer hub surfaces, as described above, adds to the cost. Further, to provide the precisely parallel flat surfaces at the ends of the hubs, and the precisely dimensioned slots, they have typically been machined after the forging operation. All these factors result in a high manufacturing cost per unit even when they are made in very large production quantities.

SUMMARY OF THE INVENTION

A general object of the invention is to provide an improved fork end fitment connector for a bicycle.

Another object is to provide such a connector which is identical in shape and size, and equivalent or better in strength to conventional hot-forged connectors, with machined and chromium-plated outer hub surfaces, but is substantially less expensive to manufacture.

Another object is to provide such a connector comprising a laminated reinforced structure in which a reinforcing face plate or plates are permanently fused onto one or both sides of a base plate and they additionally serve as raised hub portion(s) around an axle-receiving slot.

An important feature of the invention is to provide the connector in the form of a two- or three-piece laminated construction consisting of a base plate member formed from a flat, uniform thickness steel plate with an axle-engaging slot and one or two reinforcing face plates formed from flat uniform thickness sheets, preferably of stainless steel, permanently fused to the base plate member and having individual slot(s) therein registering with the slot in the base plate member.

Another object is to provide a process for manufacturing such a laminated, reinforced connector which provides a superior quality end product at considerable cost saving over conventional hot forging techniques.

BRIEF DESCRIPTIONS OF THE DRAWINGS

Other objects and advantages will be apparent from the following description taken in connection with the accompanying drawings in which:

FIG. 1 is a right side view of a bicycle rear axle assembly showing one form of the present invention;

FIG. 2 is a fragmentary rear view of FIG. 1;

FIG. 3 is an exploded, perspective view of the components of the fitment connector shown in FIG. 1 before assembly;

FIG. 4 is an enlarged fragmentary cross-sectional view of FIG. 3 taken on the line 4—4;

FIG. 5 is a perspective, assembled view of the components shown in FIG. 3;

FIG. 6 is a rear view of FIG. 5;

FIG. 7 is a view similar to FIG. 3 of a form of fitment connector shown on the left side of the bicycle rear wheel assembly.

FIG. 8 is a perspective, assembled view of parts shown in FIG. 7;

FIG. 9 is a view similar to FIG. 6 of a modified form of the invention; and

FIG. 10 is a schematic representation of apparatus used in press-weld assembling of the fitment connector.

Like parts are designated by like reference characters throughout the figures of the drawing.

DESCRIPTION OF THE PREFERRED EMBODIMENT

Referring now to the specific embodiment of the invention shown in the drawings, FIG. 1 shows the external parts conventionally associated with a rear axle assembly of a bicycle. A bicycle frame (not shown) typically includes a rear fork 20 comprising a pair of upper frame stays 22 and a pair of lower frame stays 24 straddling the rear wheel. The forward ends of the upper frame stays 22 are secured in the usual manner as by welding to the frame beneath the seat (not shown) and the forward ends of the lower frame stays 24 are secured to the pedal crank hanger (not shown) in the same manner.

The rear ends of stays 22 and 24 on each side are secured as be welding to one of the rear fork end fitment connectors which are the subject of the present invention. The connectors on opposite sides are similar in construction and are manufactured by the same process which will be described. They are designated 26 and 26a on the right and left sides of the wheel assembly respectively and are identical except that connector 26 has a lower arm 28 for supporting a derailleur 30 as will be described.

Fitment connector 26 is here illustrated as a base plate member 32 cold-formed by any suitable punching, pressing and screw-threading operation from flat, mild steel plate, typically about three-sixteenths inch thick. It consists of a body 34 having angularly offset peripheral extensions 36 and 38 connected as by welding to upper and lower frame stays 22 and 24 respectively. It has a rear-axle-engaging slot 40 with an open end 42. A small, ring portion 44 has an opening 46 screw-threaded to receive a bolt 45 (FIG. 1) fastening a pair of rear fender supporting struts 48 and 50 as shown in broken lines in FIG. 1. The lower arm 28 (on connector 26 only) has an opening 52 screw-threaded to receive a bolt 54 (FIG. 1) fastening the derailleur 30 which determines the position of chain 56 on a multiple sprocket assembly 58.

A pair of face plates 60, 60 are cold-formed by any suitable punching operation from flat metal sheet, preferably stainless steel, typically about 0.06 inches thick. Each consists of a U-shaped body 62 having a rear-axle-engaging slot 64 and a lower arm 66 (on connector 26 only) of size and shape matching the base member slot 40 and registrable therewith. A lower ring portion 68 is provided at the end of arm 66 with an opening 70 in registration with opening 52 in the base plate member.

The use of flat stainless steel for the face plates 60 has two advantages: *first*, it avoids the necessity of machining or grinding the hub surfaces to make them flat and parallel; and, *second*, after painting, they may be wiped clean to provide scratch-free, rust-free seats for the axle nut to bear against, thereby avoiding the extra expense of chromium-plating them.

The two face plates 60, 60 may be assembled onto the base plate member 32 in a single electric press-welding operation. To facilitate this, a plurality of inwardly extending dimples 72 (FIG. 4) are made in the face plates when they are punched and formed. This provides a plurality of points to concentrate the electrical current passing through the assembly. These will be instantaneously melted in the press-welding operation thereby fusing a substantial area of each face plate portion to the base member surrounding each dimple. For all practical purposes, this makes the three parts one, integral, laminated unit with no space between them (as best shown in FIG. 6) and with the two outside surfaces 74, 74 being perfectly flat and precisely parallel to one another for secure, shake-resistant engagement between outer axle nut 80 and inner axle lock nut 82.

Thus, the face plates 60 assembled to the base plate member 32 in this manner comprise, in effect, a thickened hub portion extending outwardly about 0.06 inches on each side of the connector in the example given, but the manufacturing technique described avoids the high cost of conventional hot-forging and machining techniques.

As stated, rear fork fitment connectors 26 and 26a are identical except that the lower arm 28 is omitted from connector 26a, as shown in FIG. 8. Connector 26a is produced in exactly the same way as described above for connector 26, so this description will not be duplicated for it. Briefly, a base member 32a will be assembled as described above between a pair of U-shaped face plates 60a, 60a to provide the integral, laminated connector assembly 26a shown in FIG. 8. Inwardly extending dimples 72, 72 will facilitate electric fusion welding as described above in connection with dimples 72. Each connector 26a has flat, parallel outer bearing surfaces on plates 60a which are engaged between the left hand axle nut 84 and axle lock nut 86 as shown in FIG. 1.

FIG. 9 shows a modified form of the invention identified 26b. This is identical to connector assembly 26 shown in FIG. 6 except that a single face plate 60 is used on one side of the base member 32.

The connectors 26 and 26a are assembled in an electrical press-welding operation as shown schematically in FIG. 9. The base plate member 32 (or 32a) is positioned between the face plates 60 (or 60a) which in turn are supported in conductive copper holders 76, 76. The latter are connected to high amperage power lines $L_1$ and $L_2$ through a control circuit 78 which allows current to pass through the assembly for a length of time sufficient to melt the dimples 72 (or 72a) and to enable substantially all the contacting surfaces between the base plate member 32 (or 32a) and the base plates 60 (or 60a) to be fused. In practice, about 80% of the mutually contacting areas will be permanently fused together.

The cost saving of the laminated connectors made in accordance with this invention is very substantial. Applicant has found that connectors made in accordance with this invention are at least 40% cheaper to manufacture in the above-described laminated form than in the conventional, one-piece hot-forged and machined form, yet there is no diminution in quality or strength. The cost savings amount to several hundred thousand dollars in a production run of a million bicycles.

Although only fitment connectors for a rear fork have been specifically described above, it should be understood that the invention is equally applicable to front fork connectors.

The embodiments described and shown to illustrate the present invention have been necessarily specific for purposes of illustration. Alterations, extensions and modifications would be apparent to those skilled in the art.

The embodiments of the invention in which an exclusive property or privilege is claimed are defined as follows:

1. A laminated, reinforced fork end fitment connector for a bicycle comprising:
   a base plate member formed from flat uniform thickness plate stock having at least one offset peripheral extension adapted to connect to a fork end of a bicycle and having an axle-engaging slot;
   at least one face plate formed from flat uniform thickness stainless steel sheet stock and having a slot matching the size and shape of the axle-engaging slot in the base plate member; and
   said face plate being permanently affixed to at least one side of the base plate member with the slot thereof registering with the axle-engaging slot in the base plate member;
   whereby said face plate provides a thickened hub portion for the connector having an outer surface raised above the surface of the base plate member and assembleable to provide a seat for an axle nut in a bicycle axle assembly.

2. A laminated, reinforced fork end fitment connector for a bicycle comprising:
   a base plate member formed from flat uniform thickness plate stock having at least one peripheral extension adapted to connect to a fork end of a bicycle and having an axle-engaging slot;
   a pair of face plates formed from flat uniform thickness sheet stock and having slots matching the size and shape of the axle-engaging slot in the base plate member; and said face plates being permanently affixed to opposite sides of the base plate member with the slots thereof registering with the axle-engaging slot in the base plate member;

whereby said face plates provide thickened hub portions for the connector having opposite surfaces raised above the surfaces of the base plate member and assembleable to provide opposite seats for axle nuts in a bicycle axle assembly.

3. A laminated, reinforced fork end fitment connector according to claim 2 in which the base plate member is made of cold-formed steel plate stock, and the face plates are made of cold-formed stainless steel sheet stock affixed as by welding to the base plate member.

4. A laminated, reinforced fork end fitment connector according to claim 2 in which the base plate member and the face plates have outwardly extending coplanar arms with openings in registration to provide a derailleur mounting.

* * * * *